(12) United States Patent  (10) Patent No.: US 8,333,387 B2
Wheeler  (45) Date of Patent: Dec. 18, 2012

(54) HIGH PRESSURE FLUID SEALING MECHANISM

(75) Inventor: Michael J. Wheeler, Plymouth, MN (US)

(73) Assignee: Jet Edge, Inc., St. Michael, MN (US)

( * ) Notice: Subject to any disclaimer, the term of this patent is extended or adjusted under 35 U.S.C. 154(b) by 605 days.

(21) Appl. No.: 12/496,524

(22) Filed: Jul. 1, 2009

(65) Prior Publication Data

US 2010/0001472 A1  Jan. 7, 2010

Related U.S. Application Data

(60) Provisional application No. 61/077,394, filed on Jul. 1, 2008.

(51) Int. Cl.
  *F16L 25/00* (2006.01)
(52) U.S. Cl. .................................. 277/616; 277/314
(58) Field of Classification Search .............. 277/314, 277/608, 616
  See application file for complete search history.

(56) References Cited

U.S. PATENT DOCUMENTS

| 1,896,261 | A | | 2/1933 | True |
| 3,265,413 | A | | 8/1966 | Currie |
| 4,349,204 | A | * | 9/1982 | Malone ..................... 277/334 |
| 4,570,981 | A | | 2/1986 | Fournier et al. |
| 4,736,967 | A | | 4/1988 | Mott et al. |
| 5,050,895 | A | | 9/1991 | Hashish et al. |
| 5,172,939 | A | | 12/1992 | Hashimoto |
| 5,380,019 | A | | 1/1995 | Hillery et al. |
| 5,489,127 | A | | 2/1996 | Anglin et al. |
| 5,529,349 | A | | 6/1996 | Gibbs et al. |
| 5,848,813 | A | | 12/1998 | Albrecht |
| 5,997,050 | A | | 12/1999 | Fleckenstein et al. |
| 6,045,162 | A | | 4/2000 | Haibara |
| 6,729,659 | B2 | | 5/2004 | Schroeder et al. |
| 6,802,541 | B2 | | 10/2004 | Hopinks et al. |
| 7,247,006 | B2 | | 7/2007 | Hopkins et al. |
| 2008/0019851 | A1 | | 1/2008 | Hopkins et al. |

* cited by examiner

*Primary Examiner* — Gilbert Lee
(74) *Attorney, Agent, or Firm* — Dicke, Billig & Czaja PLLC

(57) ABSTRACT

A high pressure fluid system includes a sealing mechanism, which provides a fluid seal for a cylindrical bore via pressing contact between a first convex, curved surface at an end of the cylindrical bore and a second convex, curved surface at a containment element that is coupled relative to the end of the cylindrical bore.

29 Claims, 6 Drawing Sheets

HIGH PRESSURE FLUID SEALING MECHANISM

CROSS-REFERENCE TO RELATED APPLICATIONS

This application claims priority under 35 U.S.C. §119(e) to U.S. Provisional Patent Application Ser. No. 61/077,394, filed on Jul. 1, 2008, and incorporated herein by reference.

BACKGROUND

High pressure fluids help to accomplish a number of tasks. In just one example, high pressure fluids are used to produce a highly focused stream of water (i.e. a water jet) to cut materials and/or shapes that would be otherwise difficult to cut with conventional cutting tools. These systems rely on containing a volume of fluid under high pressure or ultra-high pressure. These high pressures cause a great deal of difficulty in containing the fluid without leaking and/or without damage to the containment systems. Moreover, cyclical pressure fluctuations compound the problems associated with containing high pressure fluid.

Accordingly, in conventional high-pressure fluid containment systems, sealing mechanisms are provided at various locations between adjacent components of the fluid vessel to contain the fluid under pressure. The seals may include a combination of malleable and/or rigid materials, which fatigue or wear over time, causing failure of the sealing mechanisms. Because these systems also typically place a compressive load onto elements of the vessel, this loading also contributes to a reduced life and/or failure of the sealing mechanisms.

As increasingly high fluid pressures are applied with these fluid containment systems, considerable challenges remain in attempting to provide effective, robust sealing mechanisms that can withstand both the wear due to compressive loading and high fluid pressures while still effectively containing the fluids.

BRIEF DESCRIPTION OF THE DRAWINGS

Aspects and features of the present invention will be appreciated as the same becomes better understood by reference to the following detailed description of the embodiments of the present invention when considered in connection with the accompanying drawings, wherein.

DESCRIPTION OF EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Embodiments of the present invention provide effective and robust sealing for high pressure fluid systems that include passageways and junctions employed to selectively constrain the high pressure fluid. In one non-limiting example of a high pressure fluid system, a cylindrical bore extends through at least a portion of a body and is configured to contain fluid therein. In some embodiments, an outer surface of the body forms a cylinder while in other embodiments, the outer surface of the body forms a non-cylindrical shape. In one embodiment, the high pressure fluid system includes a sealing mechanism that provides a fluid seal for the cylindrical bore via pressing contact between a first convex, curved surface at an end of the cylindrical bore and a second convex, curved surface of a containment element or fitting element that is coupled relative to the end of the cylindrical bore.

These embodiments, and other embodiments, will be described in association with FIGS. 1A-6.

Figure 1A:
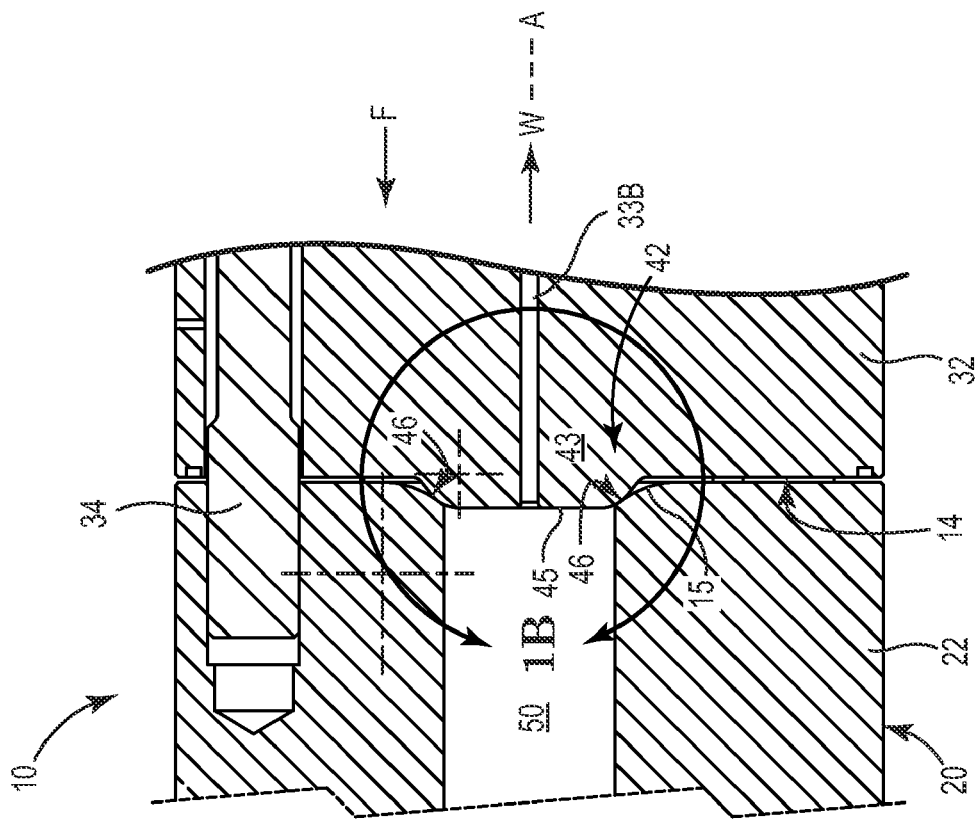
FIG. 1A is a sectional view of a fluid containment system, according to an embodiment of the present invention.
Figure 1A:
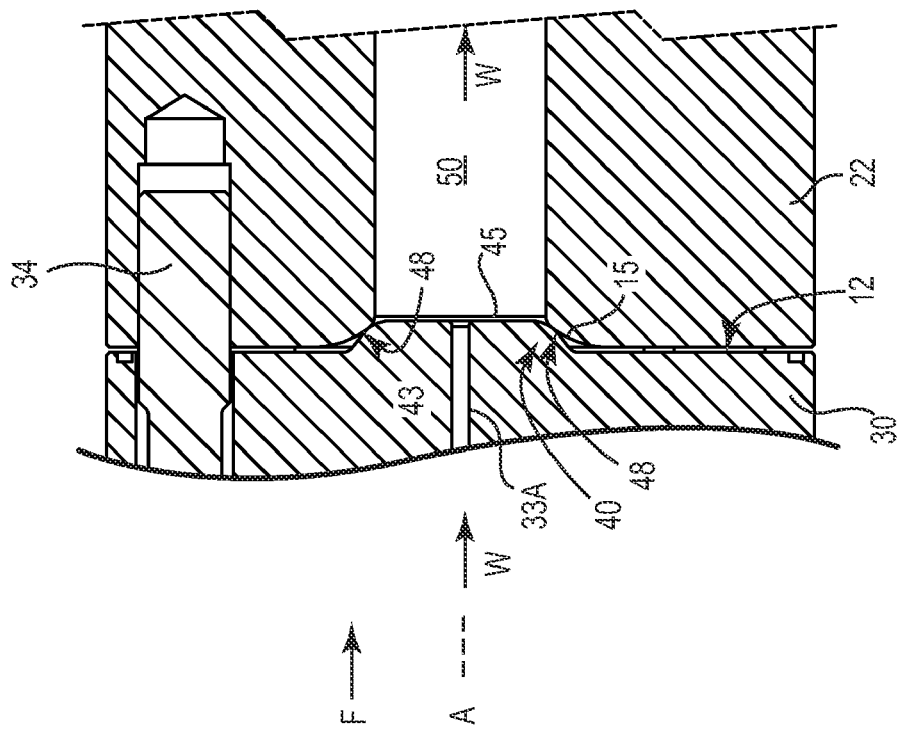

FIG. 1A is a sectional view of a high pressure fluid system 10, according to an embodiment of the present invention. In general terms, the fluid system provides a pathway through which pressurized fluid flows and/or a container for holding fluid under pressure. In a couple of non-limiting examples, the fluid system 10 may comprise an attenuator of a high pressure fluid jetting system or an intensifier pump of a high pressure fluid jetting system. In each of these systems, one or more portions of the system comprise a body portion that includes a bore for containing the pressurized fluid, and through which the fluid flows, prior to the pressurized fluid exiting the respective portion. Because these systems include connections between a sequence of components, embodiments of the present invention provide for robust sealing at these points of connections between adjacent components.

With this in mind, as illustrated in FIG. 1, high pressure fluid system 10 includes a body 20 constrained between containment (e.g. fitting) elements 30 and 32 with rods 34 (along with other well known non-illustrated compression-providing components, such as nuts, etc.) applying an external compressive force (as represented by directional arrow F) on body 20 to force a portion of containment element 30 against end 12 of body 20 and to force a portion of containment element 32 against end 14 of body 20, respectively.

In one aspect, wall 22 of body 20 defines a cylindrical bore 50 that extends through body 20 between the opposite ends 12 and 14. In yet another aspect, a fluid enters bore 50 at end 12 via inlet 33A of containment element 30, moves through bore 50, and exits end 14 of bore 50 through outlet 33B of containment element 32 (as represented by directional arrow W). In one embodiment, each respective containment element 30, 32 comprises a type of fitting element configured to be releasably secured against a respective one of the opposite ends 12, 14 of body 20. In one aspect, the fitting element acts to seal the ends of the cylindrical bore 50 relative to the exterior environment and typically also provides a transition to another component or portion of the larger fluid system 10. As such, each containment element 30, 32 typically includes a conduit (for example, inlet 33A or inlet 33B in FIG. 1A) extending through at least a portion of the body of the containment element 30, 32.

In one embodiment, end 14 of body 20 and the corresponding containment element 32 define a sealing mechanism 42. In one aspect, the sealing mechanism 42 is at least partially defined by a protruding body portion 43 of a containment element 32 that extends generally toward end 14 of body 20, with the protruding body portion 43 being configured to form a sealing interface 46 relative to end 14 of cylindrical bore 50. In some embodiments, as shown in at least FIGS. 1A-1C, the end 14 of body 20 forms a shallow recess 15 (that carries convex, curved surface 62) while the protruding body portion 43 forms an end 45 (that carries convex, curved surface 60) which functions as a protrusion generally shaped and sized to be reciprocally coupled relative to the recess 15 at end 14 of body 20.

In one embodiment, both the sealing mechanism 42 at end 14 of body 20 and the sealing mechanism 40 at end 12 of body 20 comprise substantially the same features and attributes, at least with respect to having a sealing interface 46 or 48, respectively, in which a first convex, curved surface is in pressing contact against a second convex, curved surface. These sealing interfaces 46, 48 are later described in more detail in association with FIGS. 1B-6. However, in other embodiments, just one of respective sealing mechanisms 40, 42 comprise a sealing interface 46 (or 48) while the other one of the respective sealing mechanism 40, 42 comprises a different type of sealing structure other than a sealing interface 46.

In some embodiments, system 10 contains and moves fluids within cylindrical bore 50, such as water, under high pressure or ultra-high pressure for a myriad of waterjetting applications. In one embodiment, as noted above, system 10 generally corresponds to an intensifier pump for converting water or fluid under low pressure to a high pressure (or ultra-high pressure) prior to jetting the highly pressurized water. It will be understood that an intensifier pump typically would include additional structures (such as valves, other sealing mechanisms, plunger, etc.) within and around the bore 50, with these structures being excluded from the Figures for illustrative clarity. In another embodiment, as noted above, system 10 corresponds to an attenuator, which receives high pressure fluid from an intensifier pump. Some waterjetting applications include water cutting, surface preparation, coating removals, etc. In other embodiments, system 10 contains non-water fluids under high pressure or ultra-high pressure.

With this in mind, the materials forming body 20 and containment elements 30, 32 are substantially rigid, high strength materials including, but not limited to, stainless steel materials or other metallic materials. Moreover, it will be understood that these substantially rigid materials, as deployed in sealing mechanisms 40, 42, will exhibit some degree of flexure when placed under sufficiently high compressive loads and/or sufficiently high fluid pressures. However, the particular arrangement of the opposed convex, curved contact surfaces of the sealing interfaces 46, 48 of the respective sealing mechanisms 40, 42 acts to provide managed component flexure during the compressive loading and/or exposure to high fluid pressures, resulting in a near-zero relative motion between the adjacent components to maintain the fluid-tight seal, as described further below.

In one aspect, the sealing mechanisms 40, 42 of fluid system 10 have been experimentally proven to maintain fluid-tight sealing while containing static fluid pressures of at least 130,000 psi. Moreover, because of the mechanics of the substantially zero relative motion achieved via the sealing interfaces 46, 48, as described further throughout this description, in some embodiments, the sealing mechanism 40, 42 have maintained robust, fluid-tight sealing of static fluid pressures within a range from about 110,000 psi to about 130,000 psi. In one embodiment, the sealing interfaces 46, 48 of the sealing mechanisms 40, 42 have maintained robust, fluid-tight sealing of static fluid pressures of at least 130,000 psi. Accordingly, the system 10 is capable of handling both high pressure fluids and ultra-high pressure fluids.

With further reference to FIGS. 1B-6, exemplary embodiments of a sealing interface 46 of a pair of convex, curved surfaces is described for sealing mechanism 42 with it being understood that this description is generally applicable for sealing interface 48 of sealing mechanism 40.

Figure 1B:
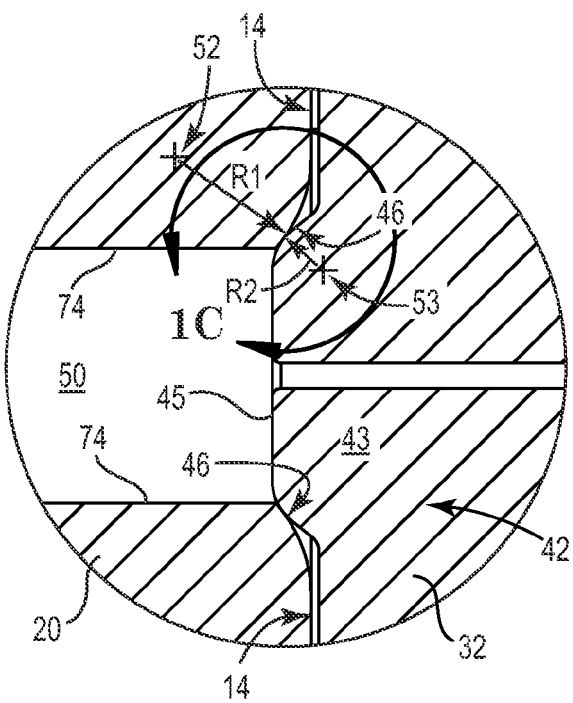
FIG. 1B is an enlarged sectional view of detail portion 1B of the fluid containment system of FIG. 1A, according to an embodiment of the present invention.
Figure 1C:
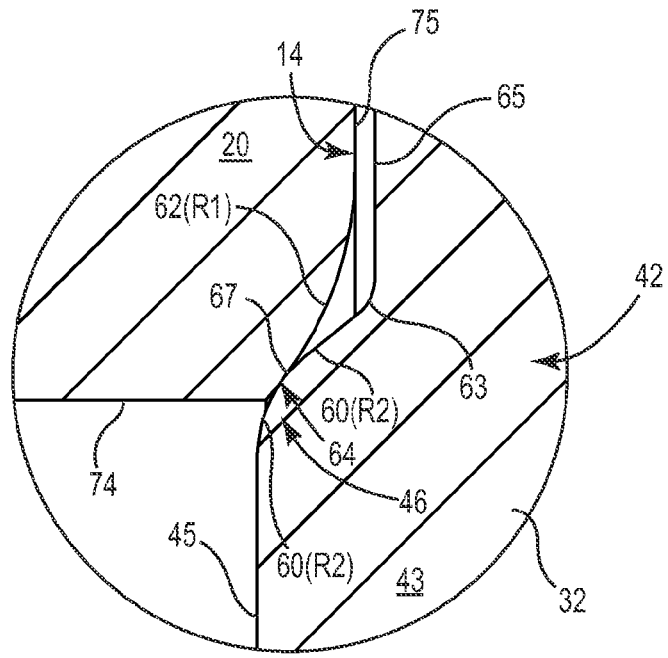
FIG. 1C is an enlarged sectional view of detail portion 1C of the fluid containment system of FIG. 1B, according to an embodiment of the present invention.

One exemplary embodiment of a sealing interface of a pair of convex, curved surfaces is described for sealing mechanism 42 FIG. 1B is an enlarged sectional view corresponding to detail 1B in FIG. 1 and FIG. 1C is an enlarged sectional view corresponding to detail 1C in FIG. 1B, according to one embodiment of the present invention. As shown in FIG. 1B, sealing mechanism 42 includes a radially symmetric, protruding body portion 43 of containment element 32 that forms a sealing interface 46, which is defined at a generally circular line 67 of contact between second end 14 of body 20 and end 45 of the protruding body portion 43. In particular, as shown in FIG. 1C, protruding body portion 43 defines a generally convex, curved surface 60 that is in tangential contact with a generally convex, curved surface 62 of end 14 of body 20 to define the circular line 67 of contact and/or a narrow contact sealing band 64. In one aspect, the convex, curved surface 62 has a generally, radially symmetric shape.

It will be noted that in FIG. 1C, the lines normally denoting a sectional are omitted for illustrative clarity. Moreover, while FIGS. 1B, 1C illustrate a cross-sectional profile of the convex, curved surface 60 and the convex, curved surface 62, it will be understood that these convex, curved shapes extend in three-dimensional space as generally toroidal elements.

In one aspect, as shown in FIGS. 1B-1C, the convex, curved surface 62 of body 20 has a first radius of curvature R1 while the convex, curved surface 60 of containment element 32 has a second first radius of curvature R2. In another aspect, as shown in FIGS. 1B-1C, a center point 52 of first radius R1 is located within a portion of wall 22 (of body 20) while a center point 53 of second radius R2 is located within a portion of containment element 32. In one embodiment, the first radius R1 is generally greater than the second radius R2. In another aspect, circular contact line 67 or contact band 64 is spaced laterally outward in a radial direction from inner wall 74 of body 20 (that defines bore 50)

Figure 2:
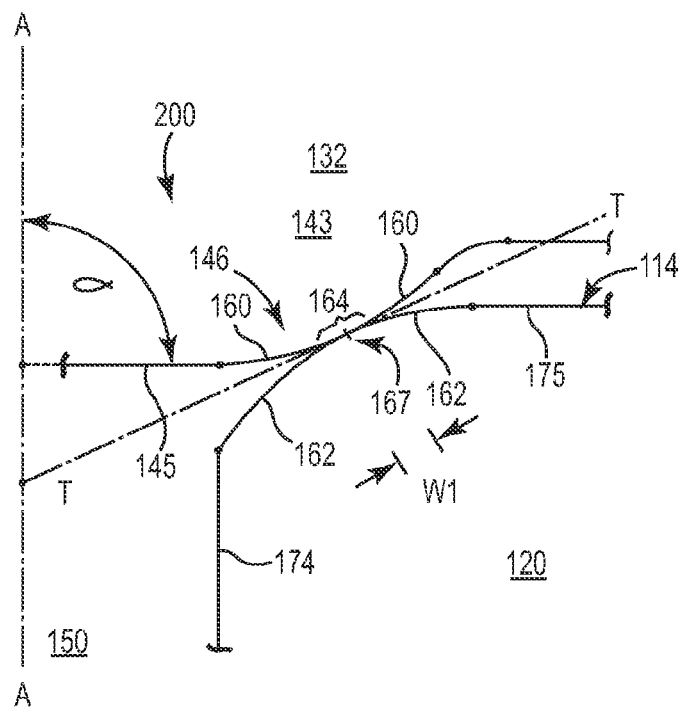
FIG. 2 is a partial sectional view that schematically illustrates a sealing structure for a cylindrical bore of a fluid containment system, according to an embodiment of the present invention.

FIG. 2 is a diagram 200 that further schematically illustrates a sealing interface 146, according to one embodiment of the present invention, in order to more fully describe the features and attributes of the sealing interface 46 (or 48) as previously described in association with FIGS. 1A-1C.

Accordingly, in general terms, the sealing interface 146 comprises at least substantially the same features and attributes as sealing interface 46 (that was previously described in association with FIGS. 1B-1C) with the features and attributes of sealing interface 146 being generally applicable to the sealing interface 46. However, as illustrated in FIGS. 2-5, sealing interface 146 has slightly different dimensions and relative positions of respective components. Finally, in general terms, FIGS. 2-5 use like components as those depicted in FIGS. 1B-1C and therefore uses like reference numerals to refer to those like components.

As illustrated in FIG. 2, a sealing interface 146 defined by end 145 of protruding body portion 143 and by end 114 of body 120, according to one embodiment of the present invention. As shown in FIG. 2, convex, curved surface 162 of body 120 is in pressing contact against convex, curved surface 160 of protruding body portion 143 at their point of tangential contact to form circular sealing contact line 167 of sealing interface 146.

It will be understood that, in some embodiments, the convex, curved surfaces 160, 162 generally correspond to spherically curved shapes or toroidal curved shapes, although other types of curved shapes are not strictly excluded provided that the opposed convex, curved surfaces 160, 162 contact each other in a manner that forms a circular line 167 of sealing contact that is generally not susceptible to significant flattening under compressive loads and/or high fluid pressures as further described below.

With this in mind, the pair of respective, convex curved surfaces 160, 162 enables two or more components to be assembled into a sealed junction or a sealed fluid passageway configured to constrain a controllable volume of fluid that is subject to high static pressures and/or subject to cyclical, large-amplitude, pressure changes. In one aspect, the convex curved surfaces 160, 162 are radially symmetric about a common axis (as represented by dashed line A). Accordingly, in general terms, when the respective convex curved surfaces 160, 162 are compressively loaded along the common axis A, a generally circular or annular contact line 167 expands into a narrow contact band 164, as illustrated in the respective diagrams 200 of FIGS. 2 and 210 of FIG. 3.

Figure 3:
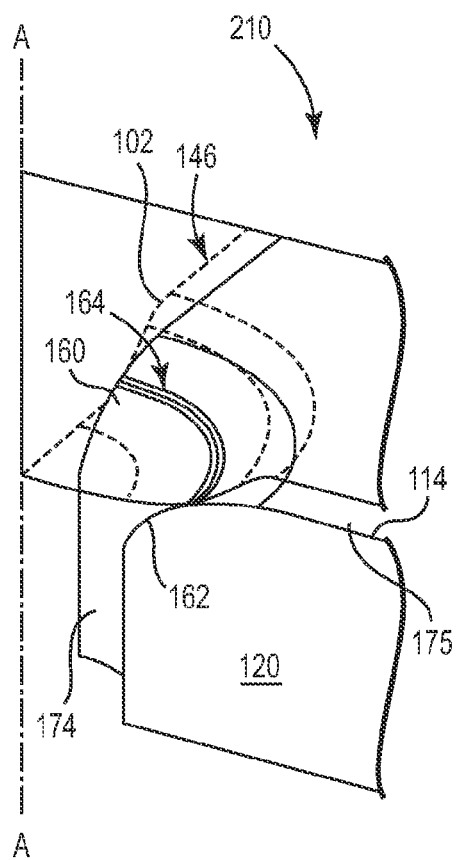
FIG. 3 is a partial perspective view that schematically illustrates the sealing structure of FIG. 2, according to an embodiment of the present invention.

In particular, as schematically illustrated by diagrams 200, 210 in FIGS. 2-3, with the externally compressive load acting to force end 145 of containment element 132 against end 114 of body 120, a small amount of deformation occurs on the respective first and second convex curved surfaces 160,162 to the point where the circular line of contact 167 between those surfaces 160,162 expands into a relatively thin, circular contact band 164. This contact band 164 has a width W1 (FIG. 2), which is still relatively quite narrow because of the convexity of the curved surfaces 160, 162. Upon developing high pressures on a fluid within the controllable volume of the fluid system 10 (which includes filling of bore 150 of body 120), some additional deformation of the convex curved surfaces 160,162 occurs. Nevertheless, because the curved surfaces 160, 162 have sufficient convexity (i.e. a small enough radius of curvature in their convex shape), despite the cumulative deformation, the area within band 164 that is adjacent to the sealing line 167 and subject to relative motion is minimized. In some embodiments, even with the presence of the contact band 164 surrounding both sides of the sealing line 167, the surface area of band 164 is not substantially greater than the surface area of the sealing line 167, such that a sufficiently high level of the concentrated, compressive sealing force is maintained at the sealing line 167 despite the presence of the band 164. In one aspect, the sealing band 164 generally surrounding both sides of the sealing line 167 is generally contiguous with the sealing line 167.

Accordingly, with this arrangement, a robust sealing mechanism is achieved via sealing interface defined by the interaction between the containment element 132 and end 114 of body 120.

With further reference to FIGS. 2-3, the angle ($\alpha$) between the common axis (A) and the line (T) tangent to both convex, curved surfaces 160, 162 is chosen such that deformation, caused alternatively by the assembly load and the maximum operating fluid pressure, results in near-zero relative motion between the two respective surfaces 160, 162 at the line 167 of contact. In one embodiment, the intersection of the line (T) tangent to both convex curved surfaces 160, 162 and their common axis (A) creates an angle of about 50 to about 89 degrees.

In one aspect, given a predetermined contact diameter (i.e., the diameter of the circular contact line 167 that extends about a circumference of the convex, curved portions 60, 62) and a pair of the tangentially contacting convex curves with fixed radii (such as convex, curves 162, 160), the distance from the center points (e.g., center points 52, 53 in FIG. 2 or center points 283, 285 in FIG. 5) of the curves to the axis of symmetry (A) can be chosen such that the relative motion at the tangential point of contact has near-zero relative motion. In one non-limiting example, a first center of a radius of curvature of one convex, curved portion will be spaced apart from a central axis of symmetry of the cylindrical bore by a first distance while a second center of a radius of curvature of the other, opposed convex, curved portion will be spaced apart from the central axis of symmetry of the cylindrical bore by a second distance. The first and second distances are selected to influence the deformation of the body and the first element such that substantially zero relative motion exists between the two surfaces at the line of sealing contact as the junction is switched between a first state of being compressively loaded and a second state of being compressively loaded and in which the controllable volume constrained by the junction is filled with high pressure fluid. The distances of the center points to the axis of symmetry can be systematically determined using modern analysis tools commonly used by individuals skilled in the art.

Figure 4:
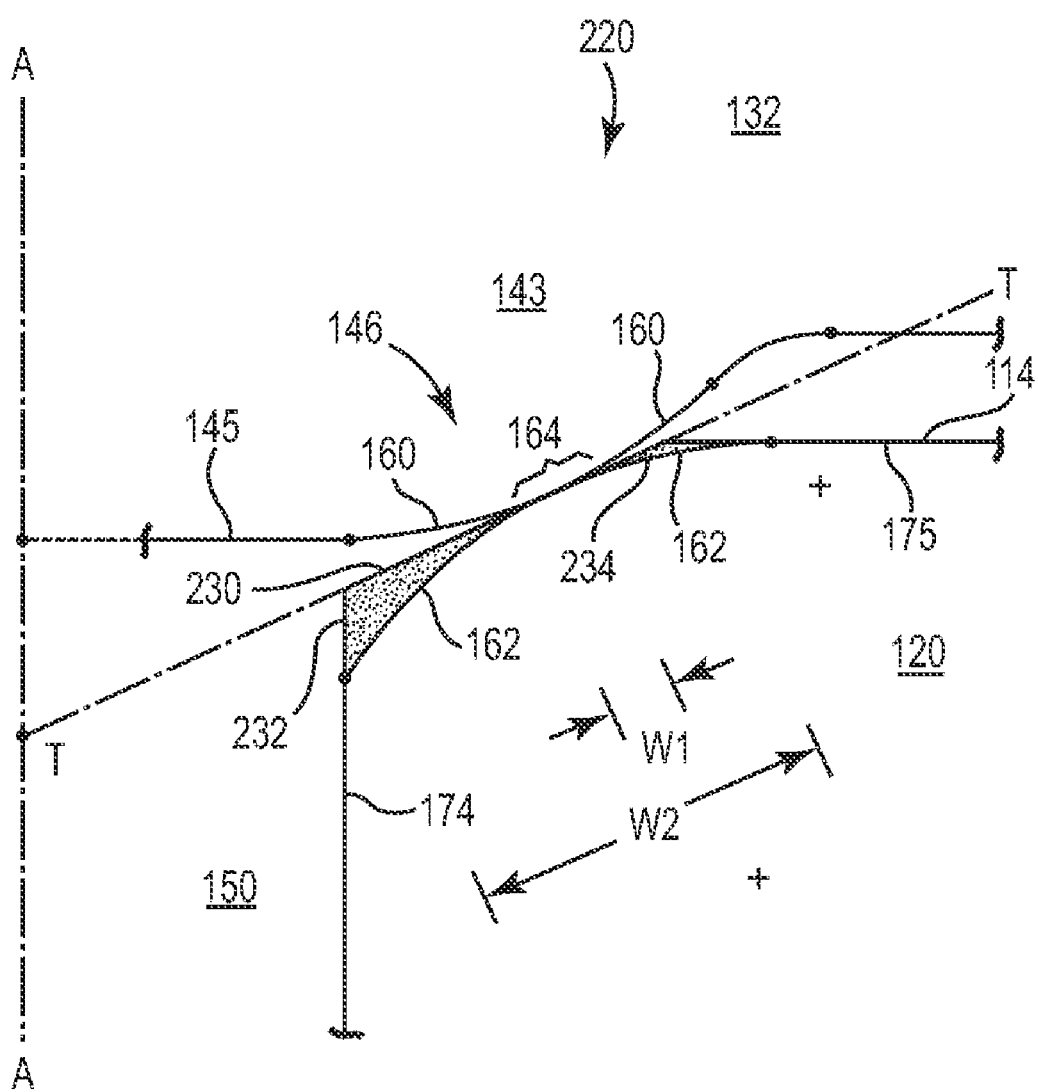
FIG. 4 is a diagram that schematically illustrates the sealing structure of FIG. 2, according to an embodiment of the present invention, in juxtaposition with a conventional sealing structure.

FIG. 4 is a diagram 220, including a partial sectional view of sealing interface 146, which schematically illustrates a comparison of this sealing interface 146 relative to conventional sealing structures. Accordingly, the sealing interface 146 shown in FIG. 4 includes substantially the same features and attributes as the sealing interface 146 previously described in association with FIGS. 2-3, except for diagram 220 additionally including a juxtaposition of a generally flat surface 230 of a conventional conical portion of an end of a body. Moreover, FIG. 4 also schematically illustrates the presence of material 232, 234 (represented by shading) that would otherwise be present to support the conventional, generally flat (i.e. conical) surface 230. In such a conventional arrangement, the compressive load applied via a curved portion of the sealing interface against a conventional conical portion of a body would cause the curved surface 160 to deform by generally flattening out sufficiently to become engaged against and generally conform to the generally flat surface 230 of the conventional sealing interface. In this conventional arrangement, the circular line of initial contact between the two respective opposed surfaces would expand into a contact interface generally corresponding to the width (W2) of the generally flat surface 230 with this enlarged, conventional contact interface having a surface area that is substantially larger than either the contact line 167 or the contact band 164 between the surfaces 160, 162 in the sealing interface 64 in embodiments of the present invention. It also will be understood that the width W2 depicted in FIG. 2 is not to scale, but is enhanced for illustrative purposes.

Moreover, this enlarged contact surface area in the conventional arrangement illustrated via surface 230 would exhibit enough relative motion between the two respective opposed surfaces (one initially convex, the other initially generally conical or flat) to cause detrimental wear on these opposed surfaces in regions of the conventional sealing interface significantly beyond the circular line of initial contact to compromise the effectiveness of the initial sealing line.

Accordingly, this juxtaposition schematically illustrated in FIG. 4 highlights how the convexity of each opposed curved surface 160, 162 of the sealing interface 164 (in embodiments of the present invention) prevents an enlarged contact surface area from developing, as in the conventional arrangement when compressive loads are applied. In other words, the convexity of the curved surfaces 160, 162 prevents flattening of one opposed surface into the other respective surface such that the surface area of the contact band 164 produced via seal interface 146 of embodiments of the present invention (that occurs upon a compressive load) generally approximates a circular line of sealing contact as compared to the substantially larger contact interface in the conventional arrangement.

Figure 5:
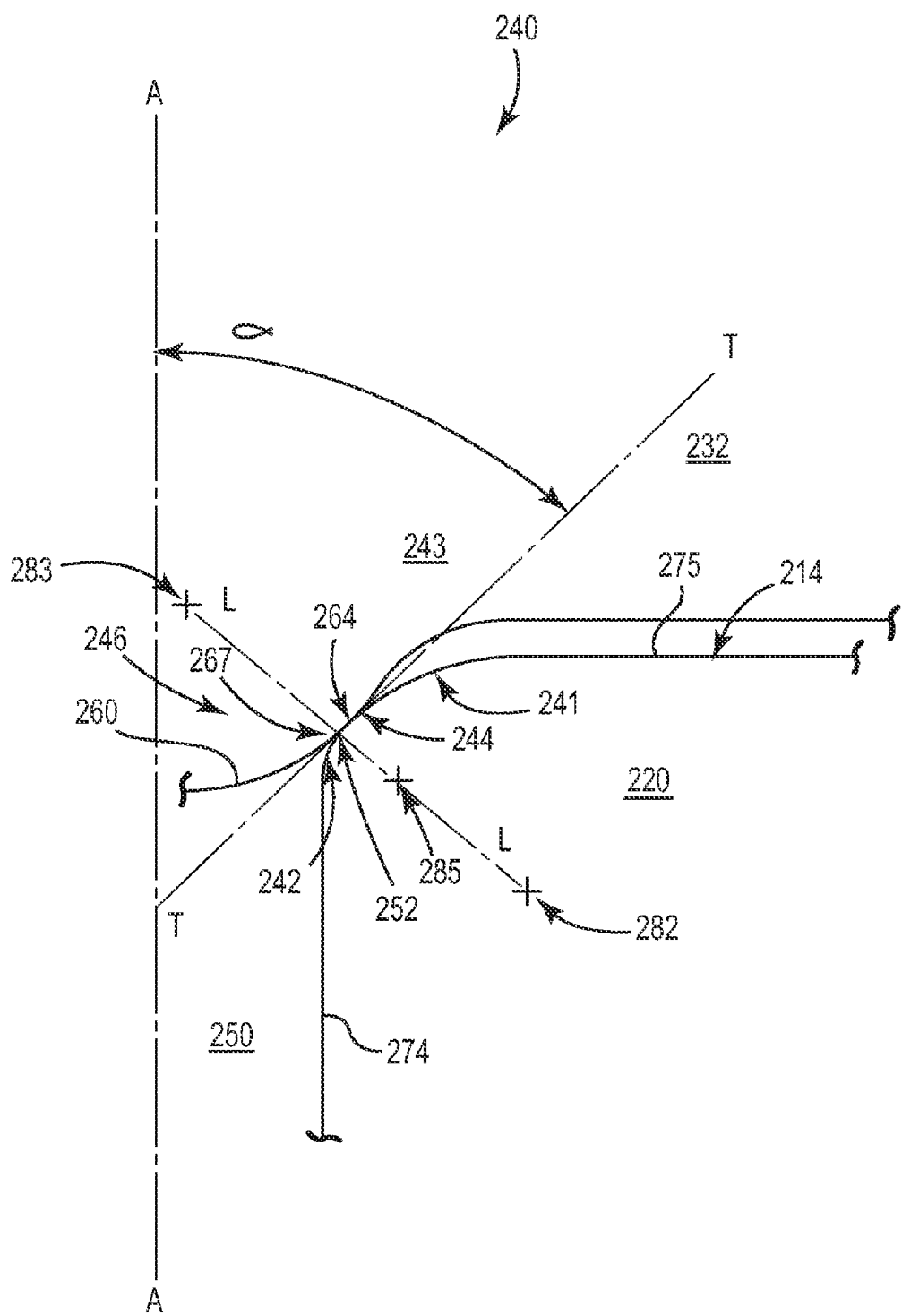
FIG. 5 is a partial sectional view that schematically illustrates an alternate sealing structure, according to an embodiment of the present invention.

FIG. 5 is a diagram 240 including a partial sectional view that schematically illustrates an alternate sealing interface 246, according to one embodiment of the present invention. This sealing structure or interface 246 has substantially the same features and attributes as the embodiments previously described in association with FIGS. 1A-4, except that at least one of the respective opposed convex, curved surfaces includes multiple, different radii of curvature. As shown in FIG. 5, in the sealing interface 246, the first convex, curved portion 241 (of end 214 of body 220) comprises a surface including a first segment 242 defined by a first radius of curvature R1 (centered at point 285) and a second segment 244, extending from the first segment, and defined by a second radius of curvature R2 (centered at point 282). In one aspect, the first segment 242 (including the first radius of curvature) is generally closer to an axial center (represented by central axis A) of the bore 250 of the body 220 than the second segment 244 (that includes the second radius of curvature). In some embodiments, the second radius of curvature R2 of the second segment 244 is substantially greater than the first radius of curvature R1 of the first segment.

As further shown in FIG. 5, in some embodiments, the first convex, curved surface 260 contacts the second convex, curved portion 241 at a junction 252 of the respective first and second segments 242,244, or in other words, at the junction of the two different radii of curvatures. The location of this junction 252 generally aligns with the centers 283,285,282 of the respective radiuses of curvature of curved portion 260, segment 242, and segment 244, respectively. This alignment is schematically illustrated via line L. In one aspect, this location of junction 252 is beneficial in reducing stress and further minimizing the width (W1 in FIG. 4) of the contact band 246 because greater compressive sealing force is concentrated at the contact line 267. Accordingly, in this example, the secondary curve segment 242 does not substantially contribute to achieving the near-zero relative motion behavior. Moreover, the distance between the center point 285 of the secondary curve segment 242 and the axis of symmetry (A) does not need to be systematically selected.

In one aspect, providing convex, curved portion 241 at end 214 of body 220 with two different radii eliminates a potentially sharp corner that could otherwise be present and instead creates a smooth transition from bore 250 to surface 275 at end 214 of body 220 (which prevents stress concentrations due to discontinuities). In another aspect, the multiple radii feature of the sealing interface 246 allows the convex, curved portion 241 of body 220 to present a smaller radius of curvature for contacting the convex, curved portion 260 of containment element 232 and a more gradual, larger radius of curvature to complete a smooth, curved transition to generally flat surface 275 at end 214 of body 220. It will be understood that the respective diagrams 200,240 of FIGS. 2, 5 are not drawn to the same scale for illustrative purposes.

It will be further understood that providing one of the opposed convex, curved portions of a sealing interface with multiple radii of curvature (as in sealing interface 246 of FIG. 5) can be done for several different reasons. Among other reasons, providing such a sealing interface allows flexibility in setting the location of the contact line between the opposed convex, curved portions without altering the diameter of the bore 250 of the body 220.

Moreover, in some embodiments, instead of being located on the convex, curved portion of the end 214 of body 220, the multiple radii curved portion 241 is provided on the protruding body portion 243 of containment element 232. In other embodiments, the multiple radii curve portion 241 is provided as just one of the respective sealing mechanisms 40, 42, while in other embodiments, both sealing mechanisms 40 and 42 (FIGS. 1A-1C) include a multiple radii curve portion 241 as part of the respective sealing mechanisms 40, 42 (FIGS. 1A-1C).

Figure 6:
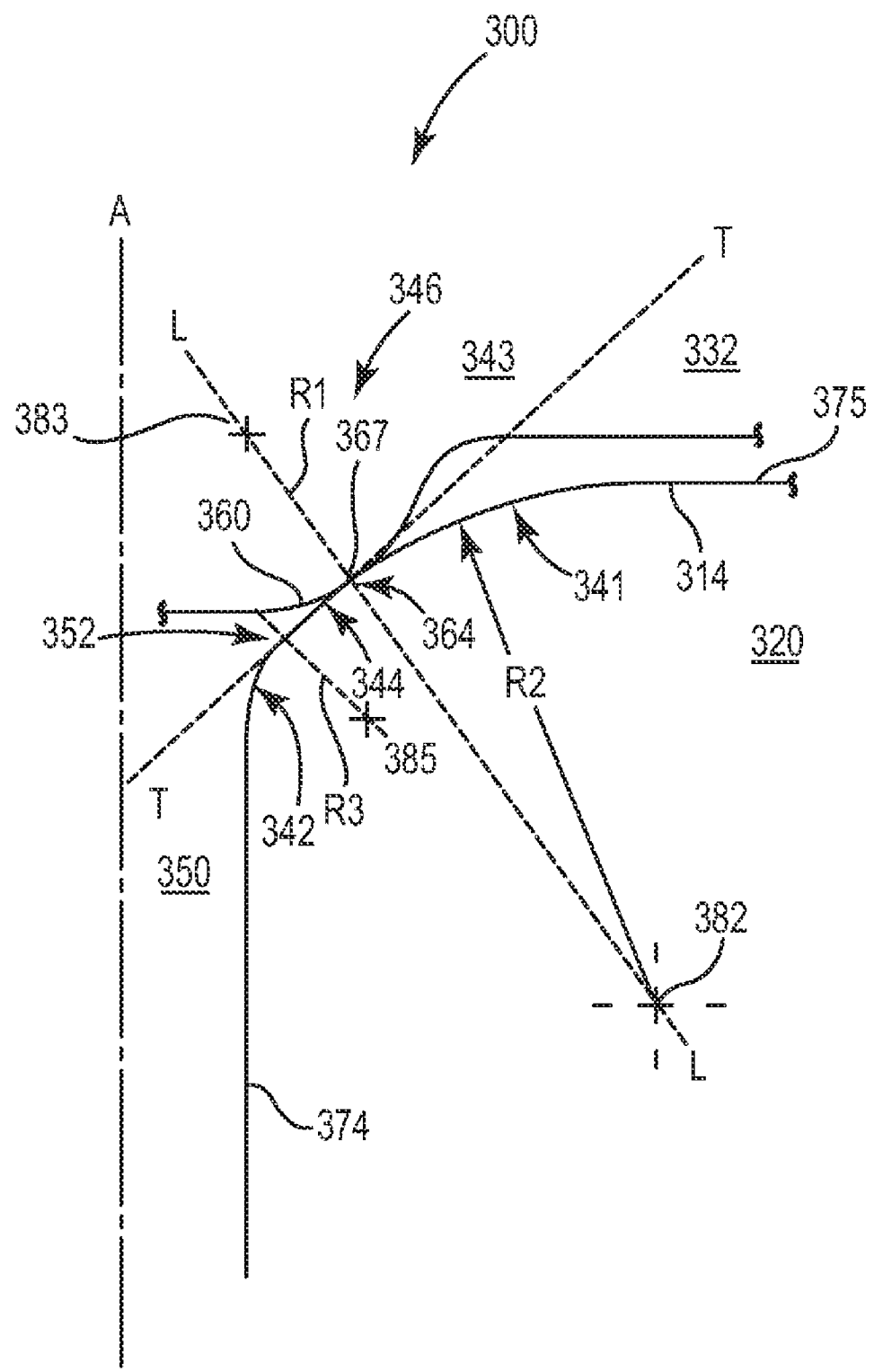
FIG. 6 is a partial sectional view that schematically illustrates an alternate sealing structure, according to an embodiment of the present invention.

In some embodiments, as illustrated in the diagram 300 of FIG. 6, a first convex, curved portion 360 (of a protruding portion 343 of a containment element 332) contacts the second convex, curved portion 341 (of an end 314 of body 320) to form sealing line 367 at a location independent of the junction 352 of the respective first and second segments 342, 344 of second convex, curved portion 341. In other words, the line of tangential contact 367 does not coincide with the junction 352 of the two different radii of curvatures of the respective segments 342 (R3 centered at 385) and 344 (R2 centered at 382) of second convex, curved portion 341. Moreover, the location of the junction 352 of the two different radii segments 342, 344 of convex, curved portion 341 does not align with the centers of 383, 382 of the radii of curvature of curved portion 360 and segment 344, respectively, and does not align with center 385 of the radius of curvature of segment 342.

While the embodiments described in association with FIGS. 1A-6 generally depict a joint between a fluid cylinder and an end portion to constrain and seal pressurized fluid that enters or exits the bore of the cylinder, it will be understood that the sealing interface described herein according to principles of the present invention (i.e., for example, pressing contact between two opposed convex, curved surfaces that are under compressive load against each other) can be applied in fittings, joints, or other portions of a fluid containment system or in other fluid applications requiring a fluid-tight seal where the fluids are under high pressure or ultra-high pressure. Moreover, as is apparent from the illustrated embodiments, this sealing interface maintains the fluid-tight seal without an accompanying O-ring or gasket at the point of sealing contact between the adjacent substantially rigid convex, curved surfaces that define the sealing interface.

Embodiments of the present invention ensure long term, robust operation of a sealing mechanism for high pressure fluid containment systems by preventing unwanted relative motion and wear between opposing contact surfaces via providing both of the opposed contact surfaces of the seal as convex, curved surfaces.

While at least one exemplary embodiment has been presented in the foregoing detailed description, it should be appreciated that variations exist. It should also be appreciated that the exemplary embodiment or exemplary embodiments are only examples, and are not intended to limit the scope, applicability, or configuration of the present invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the present invention as set forth in the appended claims and the legal equivalents thereof.

I claim:

1. A high pressure fluid sealing system comprising:
   a metallic container including a first body defining an internal volume to contain fluid, a first end surface, and a first conduit at least partially extending through the first body, wherein a radially symmetric, first convex, curved portion at least partially defines a recess relative to the first end surface and at least partially defines a transition between the first end surface and an open end of the first conduit;
   a metallic containment element including a second body, a second end surface, and a second conduit at least partially extending through the second body, wherein the second end surface includes a protrusion sized and shaped to be removably received relative to the recess of the metallic container, the protrusion including a center portion defining an open end of the second conduit and an outer portion extending radially outward from the center portion to define a radially symmetric, second convex, curved portion; and
   a compressive loading mechanism configured to force the second convex, curved portion, via compressive loading, into tangential contact against the first convex curved portion to define a generally circular line of sealing between the respective first and second convex, curved portions,
   wherein the second conduit of the metallic containment element is in fluid communication with, and axially aligned with, the first conduit of the metallic container.

2. The sealing system of claim 1, wherein the respective first and second convex, curved portions are configured to maintain substantially zero relative motion relative to each other at the generally circular line of sealing contact at least during a transition between a first state of compressive loading and a second state of compressive loading simultaneous with a presence of high pressure fluid within the container.

3. The sealing system of claim 2, wherein the respective first and second convex, curved portions are configured to partially deform in the respective first and second states into a narrow circular band of sealing contact to surround, and be contiguous with, the circular line of sealing contact, and wherein the band of sealing contact defines a contact surface area between the respective first and second convex, curved portions that is not substantially greater than a contact surface area of the line of sealing contact between the respective first and second convex, curved portions, wherein a concentrated compressive sealing force is maintained at the line of sealing contact despite the presence of the narrow band of sealing contact.

4. The sealing system of claim 2, wherein the high pressure fluid comprises static fluid pressures within a range from about 110,000 psi to about 130,000 psi.

5. The sealing system of claim 2, wherein the high pressure fluid comprises static fluid pressures of at least 130,000 psi.

6. The high pressure fluid sealing system of claim 2, wherein the generally circular line of sealing contact exclusively defines contact between the container and the containment element.

7. The high pressure fluid sealing system of claim 6, wherein the respective first and second convex, curved portions each comprise a generally toroidal shape.

8. The sealing system of claim 7, wherein the high pressure fluid comprises static fluid pressures within a range from about 110,000 psi to about 130,000 psi.

9. The sealing system of claim 1, wherein the first convex, curved portion includes a first segment, having a first radius of curvature, extending from a second segment, having a different second radius of curvature, wherein the generally circular line of sealing contact between the respective first and second convex, curved portions is located at a junction of the respective first and second segments of the first convex, curved portion.

10. The sealing system of claim 1, wherein the container at least partially defines at least one of:
    an attenuator of a high pressure water jetting system; or
    an intensifier pump of an ultra-high pressure water jetting system.

11. The high pressure fluid sealing system of claim 1, wherein the respective first and second convex, curved portions are configured to maintain substantially zero relative motion relative to each other at the generally circular line of sealing independent of a degree of fluid pressure in the first and second conduits.

12. The high pressure fluid sealing system of claim 11, wherein the generally circular line of sealing contact between the first and second convex, curved portions forms a fluid-tight sealing junction that omits an intervening sealing element.

13. A fitting element for use in sealing an open end of a fluid conduit of a fluid vessel, the fitting element comprising:
    a body; and
    a radially symmetric, first convex, curved surface at one end of the body, wherein the first convex, curved surface is configured to tangentially contact a radially symmetric, second convex, curved surface of the fluid vessel adjacent the open end of the fluid conduit to define a generally circular line of sealing contact between the respective first and second convex, curved surfaces, upon application of a compressive load to force the fitting element against an end of the fluid vessel, to produce substantially zero relative motion at the generally circular line of sealing contact during, at least, a transition between an absence of high fluid pressure within the fluid conduit and a presence of high fluid pressure within the fluid conduit.

14. The fitting element of claim 13, wherein the fitting element is made of a metallic material and includes a protrusion configured to be at least partially received in a recess defined in the end of the fluid vessel adjacent the open end of the fluid conduit, the protrusion defining at least a portion of an end surface of the fitting element and including a generally circular outer portion defining the radially symmetric, second convex, curved surface.

15. The fitting element of claim 13, wherein the first convex, curved surface includes a first segment, having a first radius of curvature, extending from a second segment, having a second radius of curvature, wherein the generally circular line of sealing contact between the respective first and second convex, curved portions is located at a junction of the respective first and second segments.

16. The fitting element of claim 13, wherein the fluid vessel at least partially defines at least one of:
an attenuator of a high pressure water jetting system; and
an intensifier pump of a high pressure water jetting system.

17. A method of sealing a junction to constrain a controllable volume of high pressure fluid, the method comprising:
providing a body that includes a conduit extending between opposite ends of the body and each end of the body defining a recess at which a respective open end of the conduit is exposed;
providing a first containment element adjacent a respective one of the opposite ends of the conduit, the first containment element including a protrusion sized and shaped to be at least partially received relative to the recess of the one of the respective ends of the body; and
providing the junction via compressively forcing a radially symmetric first convex, curved portion of the protrusion of the first containment element against, and at points of tangential contact with, a radially symmetric second convex, curved portion of the recess of the respective end of the body to define a generally circular sealing line of tangential contact between the first containment element and the respective end of the body, wherein the respective first and second convex, curved portions are configured to maintain the generally circular sealing line of tangential contact independent of a degree of fluid pressure in the conduit, and wherein the generally circular sealing line of tangential contact exclusively defines contact between the body and the containment element.

18. The method of claim 17, wherein providing the junction comprises:
configuring the junction to maintain substantially zero relative motion at the generally circular sealing line of tangential contact during, at least, a transition between the presence of high pressure fluid and the absence of high pressure fluid within the controllable volume constrained via the junction.

19. The method of claim 17, wherein providing the junction comprises:
allowing, in the presence of the high pressure fluid, a narrow circular band of sealing contact to surround, and be contiguous with, the circular line of sealing contact, wherein the band of sealing contact defines a contact surface area between the respective first and second convex, curved portions that is not substantially greater than a contact surface area of the line of sealing contact between the respective first and second convex, curved portions.

20. A high pressure fluid sealing system comprising:
a first metallic containment element including a first body, a first end surface, and a first conduit at least partially extending through the first body, wherein the first end surface includes a first protrusion, the first protrusion including a center portion defining an open end of the first conduit exposed adjacent the first end surface and an outer portion extending radially outward from the center portion to define a radially symmetric, first convex, curved portion;
a second metallic containment element including a second body, a second end surface, and a second conduit at least partially extending through the second body, wherein the second end surface includes a second protrusion, the second protrusion including a center portion defining an open end of the second conduit exposed adjacent the second end surface and an outer portion extending radially outward from the center portion to define a radially symmetric, second convex, curved portion;
a metallic body interposed between the respective first and second metallic components, the metallic body including opposite third end surfaces and a third conduit extending through the body between the respective third end surfaces, wherein a radially symmetric, third convex curved portion at least partially defines a recess relative to each respective third end surface and at least partially defines a transition between each respective third end surface and each open respective opposite end of the third conduit of the body, wherein the recess adjacent each third end surface is sized and shaped to removably receive the protrusion of the respective first and second metallic containment elements; and
a compressive loading mechanism configured to force the first convex, curved portion of the first containment element, via compressive loading, into tangential contact against the third convex curved portion of one of the third end surfaces of the body to define a first generally circular line of sealing contact between the respective first and third convex, curved portions, and the compressive loading mechanism configured to force the second convex, curved portion of the second containment element, via compressive loading, into tangential contact against the third convex curved portion of the other of the third end surfaces of the body to define a second generally circular line of sealing contact between the respective second and third convex, curved portions,
wherein the third conduit of the metallic body is in fluid communication with, and axially aligned with, the first and second conduits of the respective first and second metallic containment elements,
wherein the respective first, second, and third convex, curved portions are configured to maintain substantially zero relative motion at the respective first and second generally circular lines of sealing contact independent of a degree of fluid pressure in the respective first, second, and third conduits, and
wherein the first generally circular line of sealing contact exclusively defines contact between the first containment element and one of the third end surfaces of the body, and wherein the second generally circular line of sealing contact exclusively defines contact between the second containment element and the other of the third end surfaces of the body.

21. The sealing system of claim 20, wherein the third conduit of the metallic body and the respective first and second conduits together define a fluid passageway of at least one of:
an attenuator of a high pressure water jetting system; or
an intensifier pump of an ultra-high pressure water jetting system.

22. The sealing system of claim 21, wherein the high pressure fluid comprises static fluid pressures within a range from about 110,000 psi to about 130,000 psi.

23. The sealing system of claim 22, wherein a center axis of the radially symmetric first convex, curved portion of the first protrusion of the first containment element and a center axis of the radially symmetric second convex, curved portion of the second protrusion of the second containment element are collinear with a center axis of the radially symmetric third convex, curved portions of the recess of the body.

24. The sealing system of claim 23, wherein the respective first, second, and third convex, curved portions each comprise a generally toroidal shape.

25. The sealing system of claim 21, wherein the high pressure fluid comprises static fluid pressures of at least 130,000 psi.

26. A high pressure fluid sealing system comprising:
a metallic body including a first end surface, a first conduit at least partially extending through the body, and a radially symmetric, first convex, curved portion having a first center axis defined by the first conduit;
a metallic containment element including a radially symmetric, second convex, curved portion having a second center axis, wherein the second center axis is axially aligned with the first center axis; and
a compressive loading mechanism configured to force the second convex, curved portion, via compressive loading, into tangential contact against the first convex curved portion to define a generally circular sealing line of tangential contact between the respective first and second convex, curved portions at which substantially zero relative motion occurs independent of a degree of fluid pressure within the first conduit of the body, and
wherein a respective one of the first and second convex, curved portions is at least partially defined as a protrusion and the other one of the first and second convex, curved portions is at least partially defined as a recess sized and shaped to removably receive the protrusion.

27. The system of claim 26, wherein the generally circular line of sealing contact between the first and second convex, curved portions forms a fluid-tight sealing junction that omits an intervening sealing element and the generally circular sealing line of tangential contact is the only manner in which the body contacts the containment element.

28. The high pressure fluid sealing system of claim 26, wherein the recess is located on the metallic body and defines a transition between the first end surface and an open end of the first conduit with the first conduit defining a center axis of the radial symmetry of the first convex, curved portion, and
wherein the containment element includes a second end surface including the protrusion, wherein the protrusion includes a center portion and an outer portion extending radially outward from the central portion to at least partially define the radially symmetric, second convex, curved portion.

29. The high pressure fluid sealing system of claim 26, wherein the containment element includes a second conduit, wherein the first conduit of the body is in fluid communication with, and axially aligned with, the second conduit of the containment element, and
wherein the high pressure fluid comprises static fluid pressures at least periodically exceeding about 110,000 psi, and wherein the first conduit of the metallic body and the second conduit of the containment element together define a fluid passageway of at least one of:
an attenuator of a high pressure water jetting system; or
an intensifier pump of an ultra-high pressure water jetting system.

\* \* \* \* \*